United States Patent [19]

Menezes

[11] Patent Number: 5,452,353
[45] Date of Patent: Sep. 19, 1995

[54] CANONICAL TELEPHONE NUMBERS

[75] Inventor: Arul A. Menezes, Bellevue, Wash.

[73] Assignee: Microsoft Corporation, Redmond, Wash.

[21] Appl. No.: 170,999

[22] Filed: Jun. 24, 1993

[51] Int. Cl.⁶ ............................................. H04M 1/27
[52] U.S. Cl. ................................... 379/355; 379/354; 379/207; 379/359; 379/210
[58] Field of Search ............... 379/355, 211, 127, 242, 379/245, 246, 356, 93, 97, 201, 213, 142, 84, 88, 207, 67, 60; 455/33.2

[56] References Cited

U.S. PATENT DOCUMENTS

| | | | |
|---|---|---|---|
| 4,313,035 | 1/1982 | Jordan et al. | 379/61 |
| 4,594,477 | 6/1986 | Noirot | 379/225 |
| 4,661,974 | 4/1987 | Bales et al. | 379/198 |
| 4,731,826 | 3/1988 | Dai | 379/355 |
| 4,754,479 | 6/1988 | Bicknell et al. | 379/207 |
| 5,251,248 | 10/1993 | Tokunaga et al. | 379/207 |

FOREIGN PATENT DOCUMENTS

| | | | |
|---|---|---|---|
| 0075120 | 3/1983 | European Pat. Off. | H04M 1/274 |
| 0526832 | 2/1993 | European Pat. Off. | H04M 1/274 |
| 0530010 | 3/1993 | European Pat. Off. | H04M 1/274 |

OTHER PUBLICATIONS

Abstract of Japanese Patent No. JP-A-03 175 797, Patent Abstracts of Japan Unexamined Applications, 15:419, p. 167 E1126, Oct. 24, 1991.

Primary Examiner—James L. Dwyer
Assistant Examiner—Jacques M. Saint-Surin
Attorney, Agent, or Firm—Seed and Berry

[57] ABSTRACT

A system and method using canonical telephone numbers which allows automatic calling with any location in the world independent of the caller's location. The caller canonical telephone number and a plurality of caller prefixes are stored within the system. A telephone directory stores a plurality of callee canonical telephone numbers for locations throughout the world. The caller selects a callee canonical telephone number from the telephone directory, and the system uses the callee canonical telephone number and the caller canonical telephone number to determine which digits of the callee canonical telephone number must be placed on the telephone line to complete the call. The system then adds the appropriate prefix for international, long distance, or local telephone calls. The telephone directory may be in the form of a software file that can be transferred to any telephone location throughout the world. The telephone directory may be directly installed at any caller location without alteration for the specific location. The user may use a keypad to enter new callee canonical telephone numbers into the telephone directory, or may manually enter a non-canonical callee telephone number.

20 Claims, 3 Drawing Sheets

5,452,353

CANONICAL TELEPHONE NUMBERS

TECHNICAL FIELD

The invention relates generally to a system and method for telephonic communications, and more specifically to a system and method for uniquely defining and dialing canonical telephone numbers.

BACKGROUND OF THE INVENTION

Telephonic communications has become an accepted part of modern society. Even in the most remote portions of the earth, telephone service is available through a worldwide telephone communications network. Other communication devices, such as facsimile machines, can also use the worldwide telephone communications network to send a facsimile message from one remote corner of the earth to another, or from one office to another in the same building, simply by dialing the appropriate facsimile telephone number. The worldwide telephone communications network couples these devices to each other.

Obviously, to properly complete a telephone connection a caller must know the complete telephone number of the location to which the telephone call is placed. A drawback of the current worldwide telephone communications network is that the caller must also be aware of the location from which the call is being placed (i.e., the caller telephone number). Thus, the number and sequence of digits of the callee telephone number is dependent on the location of both the caller and the callee.

For example, in some locations the caller may have to dial a local prefix, such as a "9", to connect to an outside line while other locations do not require that a 9 be dialed to connect to an outside line. The caller may be required to dial an area code to properly complete a telephone call to one location within the United States but not to another more proximate location. These location-dependent requirements often cause confusion in placing telephone calls and the dialing of telephone numbers incorrectly.

Therefore, it can be appreciated that there is a significant need for a system and method for uniquely identifying the callee telephone and placing telephone calls in a manner that automatically takes caller location into account.

SUMMARY OF THE INVENTION

The invention is embodied in a system coupled to a telephone exchange and containing a station information storage area storing a station canonical telephone number for the caller location. Means for entering a callee canonical telephone number are also provided. The system uses matching means for sequentially comparing first and second portions of the station canonical telephone number with corresponding first and second portions of the callee canonical telephone number.

The matching means generates a first match signal if the first portion of the station canonical telephone number matches the corresponding first portion of the callee canonical telephone number, and compares the second portion of the station canonical telephone with the corresponding second portion of the callee canonical telephone number only if the first match signal was generated. The matching means generates a second match signal if the second portion of the station canonical telephone number matches the corresponding second portion of the callee canonical telephone number.

The system also includes alteration means for deleting the first portion of the callee canonical telephone number in response to first match signal and for deleting the second portion of the callee canonical telephone number in response to the second match signal to generate a callee telephone number.

The system may include a prefix adder to add a caller prefix to the beginning of the callee telephone to generate a final callee telephone number. The prefix adder may add a different prefix depending on whether the first match, second match or no match signals were generated. The system has a dialer to generate dialing signals corresponding to the final callee telephone number.

In one embodiment, the system may include a phone book having a plurality of callee canonical telephone numbers and means for selecting one of the plurality of callee canonical telephone numbers as the canonical telephone number to be dialed. The system may also include means for adding, deleting, or modifying phone book entries, individually or as a whole.

DETAILED DESCRIPTION OF THE INVENTION

Figure 1:
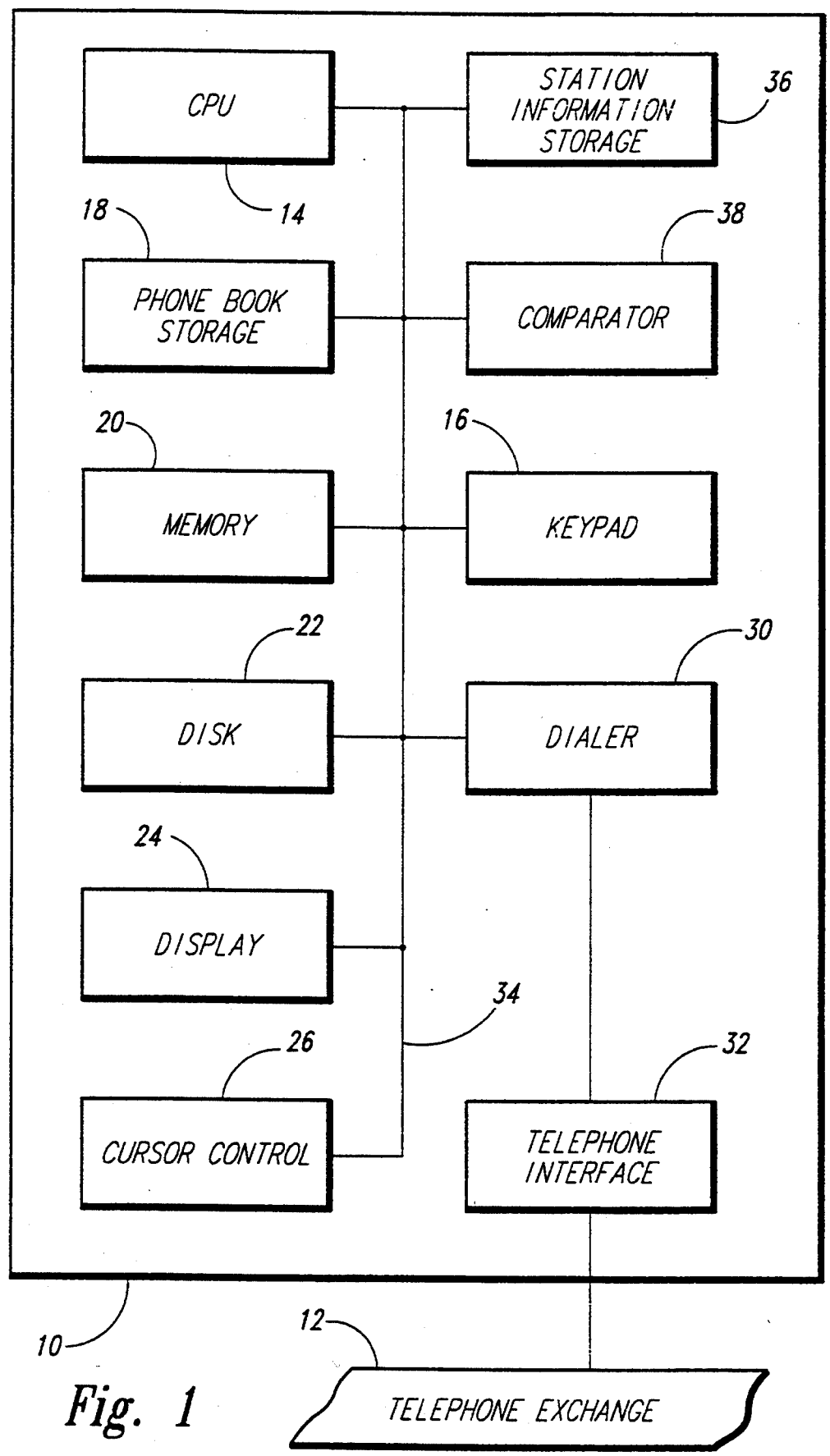
FIG. 1 is a functional block diagram of the inventive system.

A telephone number and physical location of the corresponding telephone are uniquely identified at the time the telephone is installed by the telephone company. Even a portable telephone has a unique telephone number associated with it to identify the specific device. The local telephone number comprises an exchange prefix and an individual telephone number. For example, the exchange number may be 555, and the individual telephone number 1234. If the telephone is installed in Seattle, Wash. the area code assigned to the Seattle metropolitan area is 206. Therefore, the telephone has the telephone number (206) 555-1234.

A person within the Seattle area may call the telephone in the above example by dialing the local telephone number 555-1234, while a person calling this telephone from Calif. must dial a "1", the area code, and the local telephone number. The term "dialing" as used herein refers to the process of generating signals required to complete a telephone connection. This may include rotary dialing, pulse dialing, dual-tone multi-frequency (DTMF) dialing or the like, when done manually or by a machine. The present invention is not to be limited by the manner in which dialing occurs.

The caller usually knows only the area code and local telephone number of his own telephone. The caller typically uses these numbers to provide others with his telephone number. However, there are other numbers that are associated with a particular telephone. Each country has an international code associated with it that must be dialed to indicate to the local telephone company that the call is intended for a particular other country. For example, a person calling the Seattle telephone in the example above from France must dial an international code to indicate to the local French telephone company that the call is an international telephone call to the United States. The United States has an international code of "1". Therefore, the caller in France must dial 1-206-555-1234 to reach the telephone in Seattle.

In addition, the caller may have to dial other numbers to indicate to the local telephone company that the call is a long distance call. For example a person calling the above Seattle telephone from Calif. may have to dial a "9" to get an outside line. The user may then have to dial a "1" to indicate to the local Calif. telephone company that the telephone call is a long distance call. Thus, the caller in Calif. may have to dial 9-1-206-555-1234 to call the telephone in Seattle.

If the person calling from Calif. is traveling outside Calif. and wants to call the above Seattle telephone, the person must know information about an unfamiliar local telephone system as well as the information about the Seattle telephone he wishes to call. For example, the person may need to know not to dial a "9" to get an outside line from his new location. If the person is calling from within the Seattle area, he may not need to dial a "1" or the area code. As can be understood, the telephone numbers that are required for the proper connection to a telephone are location dependent and may vary from one location to another.

The inventive system permits location independent telephone communications in which the caller need not be concerned about the location specific information in order to complete a telephone call. The system uses canonical telephone numbers that have complete information about a particular telephone. The term "canonical telephone number," as used herein, describes a complete telephone number that uniquely identifies a telephone location anywhere in the world. This includes an international country code, an area code, and a local telephone number. The term "area code" may alternatively be referred to as a long distance code, a city code, or a routing code in different countries. The present invention is not limited by the local terminology used to describe portions of the canonical telephone number. The inventive system stores the canonical telephone number for its own specific location as well, and uses only the portions of the callee canonical telephone number that are required to complete the telephone connection from the caller location to the callee location. The term "location," as used herein, refers to a specific telephone rather than a specific geographical position. As can readily be appreciated, a portable telephone can be moved from one geographical position to another. However, the telephone number assigned to that location, or telephone, remains unchanged. The inventive system can recognize non-canonical telephone numbers as well as canonical telephone numbers and is thus compatible with a normal dialing procedure in which the user enters only the required portions of the callee telephone number.

The invention is embodied in a system 10, shown in the functional block diagram of FIG. 1. The system 10 is coupled to a telephone exchange 12 by any number of well known connectors such as a modular plug (not shown). The system 10 may also be remotely coupled to the telephone exchange 12, as is the case with portable or cellular telephones. As used herein, the telephone exchange 12 includes any network capable of routing calls, such as a local exchange carrier (LEC), an interchange carrier (IXC), a private branch exchange (PBX), a Centrex facility, or any public or private telephone network. The present invention is not to be limited by the type of telephone exchange 12 to which the system 10 is coupled.

The system 10 contains a central processing unit (CPU) 14 and a keypad 16, which may be of the type commonly used in conventional telephone systems. Additional keys may also be provided on the keypad 16, as will be described below. The keypad 16 is used by the caller to manually enter the required portions of callee telephone number if the caller is not using the canonical telephone number or if the caller is initially storing a canonical telephone number for subsequent use in accordance with the present invention. Alternatively, a plurality of callee telephone numbers may be stored in a phone book storage area 18. The phone book storage area 18 may be within a memory 20 of the system 10, such as random access memory. Alternatively, the phone book storage area 18 may be stored in a nonvolatile storage device such as a disk or diskette drive 22.

A display 24, such as a video display, allows the user to view the stored canonical telephone numbers. A cursor control device 26 such as a mouse or trackball permits the user to select a particular stored canonical telephone number from the phone book storage area 18 and to enter commands related to telephone communications. Alternatively, the additional keys on the keypad 16 may be used to select a particular stored canonical telephone number from the phone book storage area 18 and enter commands related to telephone communications. If the system 10 is incorporated into a computer, such as a personal computer (PC), the CPU 14, keypad 16, phone book storage area 18, memory 20, disk 22, display 24, and cursor control device 26 may be part of the PC.

A dialer 30 generates the dialing signals on the telephone exchange 12 through a telephone interface 32. The dialer 30 and the telephone interface 32 are well known and will not be discussed herein. The portions of the system 10 are coupled to each other by a data bus 34, which may carry electrical power as well as data signals. The system 10 may also include a telephone handset (not shown) for voice communication or a modem (not shown) for electronic communication such as email or facsimile.

The canonical telephone number for a caller telephone is specific to the caller location and is stored within the system 10 in a station information storage area 36, which may be part of the memory 20 or disk 22. The caller telephone canonical telephone number is determined only one time, usually at the time of installation of the system 10. For example, if the system 10 is incorporated into a facsimile machine being installed in Seattle, Washington, the caller telephone canonical telephone number for the particular location will include the international code for the United States, the area code for the Seattle metropolitan area, and the local telephone number. In the example above, the caller telephone canonical telephone is 1-206-555-1234. The caller telephone canonical telephone number is assigned to the specific telephone and will not change unless the telephone is moved to a different location or if the telephone company changes the telephone number. In the example above, if the system 10 is moved from its Seattle location to a new location in Seattle, the system may have a new local telephone number that will be stored in the station information storage area 36. If the station is moved from its Seattle location to California, the area code will have to be changed as well.

Thus, it is readily seen that the caller telephone canonical telephone number assigned to a specific system 10 is unique to that location and must be changed if the system is moved to a new location. However, the caller station canonical telephone number for the system 10 need only be defined for the system at the time of installation and stored in the station information storage area 36. The user need not enter, or even have knowledge of, the caller telephone canonical telephone number.

In addition to the caller telephone canonical telephone number, each telephone station has prefixes that are required for the proper connection with the telephone exchange 12. A caller telephone prefix is a number that must be dialed before the callee telephone number to indicate the type of telephone call to the local telephone company. For example, a long distance call within the United States generally requires a long distance prefix "1" to be dialed before the area code and local telephone number. The system 10 stores a set of prefixes for local telephone calls, long distance telephone calls, and international telephone calls, respectively, for the particular caller telephone. The system 10 compares the caller and callee canonical telephone numbers to determine which portions of the callee canonical telephone number are required for proper connection, and then attaches the appropriate prefix so that the dialer 30 dials the appropriate prefix and portions of the callee telephone number determined by the system. The station information storage area 36 for each caller telephone stores an international prefix and a long distance prefix, and may have a local prefix as well. For example, if the caller must first dial a "9" to connect to an outside line, the local prefix for the caller station would be a "9". If the caller does not have to dial a "9" (or some other number), the local prefix is a null. Similarly, the long distance prefix is "91" (if the caller must first dial a "9" to connect to an outside line) or simply be a "1" (if the caller does not have to dial a "9"). The international prefix for the United States is "9011" (if the caller must first dial a "9" to connect to an outside line) or simply be a "011" (if the caller does not have to dial a "9"). The prefixes may also include other codes such as an access code for a long distance company, or the like. The set of telephone prefixes are defined for the system 10 only one time and are stored in the station information storage area 36. The prefixes need only be changed if the telephone is moved to a new location where the prefixes are different, such as from a line requiring a 9 to one not requiring it or vice versa. Thus, it is readily seen that the user need not enter the appropriate prefix; rather, the system 10 determines the appropriate prefix and adds it to callee telephone number.

The user may enter a callee canonical telephone number into the phone book storage area 18 using the keypad 16. Alternatively, the user may install a list of callee canonical telephone numbers into the phone book storage area 18 using the disk 22. This is particularly useful when transferring a list of callee canonical telephone numbers from one system 10 to another system of the same design. Because the callee canonical telephone numbers are location independent, a list of callee canonical telephone numbers can be easily transferred from system 10 to another without requiring any alteration of the list. For example, a large multinational corporation may have offices worldwide. Using the principles of the present invention, the corporation can create a single callee canonical telephone list for the entire corporation and store the list on a disk. Copies of the disk can be sent to all offices regardless of their locations and installed on the system 10 in each office. In this manner, each office can be supplied with a telephone list for the entire corporation with a minimum of labor. No translation of the phone list is required for specific locations. This feature also simplifies the task of updating the telephone list as it changes since the same list can be used in any location throughout the world.

The callee canonical telephone numbers stored in the phone book storage area 18 can be selected by the user by a number of well known means. For example, the system 10 can use a menu in which the stored canonical telephone numbers are displayed for the user. The user may select a particular callee canonical telephone number using the cursor control device 26 to position a cursor on the display 24 at the display location of the selected callee canonical telephone number. Alternatively, if the display 24 is a touch-sensitive display, the user may select the selected callee canonical telephone number by touching the touch-sensitive display at a position corresponding to the displayed location of the selected callee canonical telephone number. It is to be understood that the manner in which callee canonical telephone numbers are selected should not be considered a limitation of the present invention. The user may edit one or more entries in the phone book storage area 18 using the keypad 16.

Once the callee canonical telephone number has been selected by the caller, the system 10 compares the callee canonical telephone number with the caller canonical telephone number stored in the station information storage area 36. A comparator 38 compares portions of the caller telephone canonical telephone number with corresponding portions of the selected callee canonical telephone number and generates a match signal if the portions match. The system 10 only uses the portions of the callee canonical telephone number that are required to make a proper connection. After the required portions of the callee telephone have been determined, the system 10 adds the appropriate caller telephone prefix to the callee telephone number to generate a final callee telephone number. The final callee telephone number includes the appropriate prefix and required portions of the callee canonical telephone number. The dialer 30 dials the final callee telephone number to place a telephone call to the callee telephone.

Figure 2A:
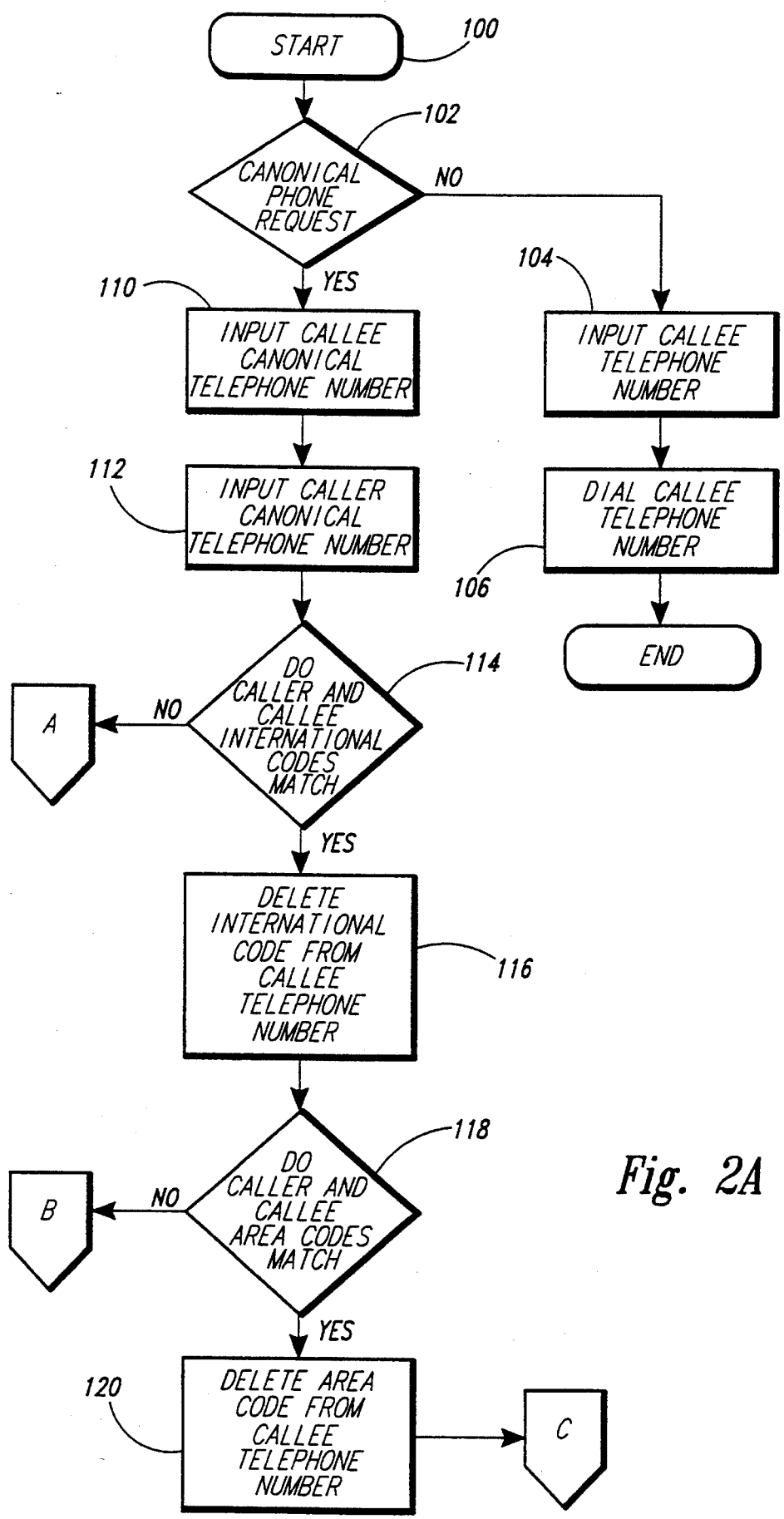
FIG. 2A is a flow chart illustrating the operation of the system of FIG. 1.
Figure 2B:
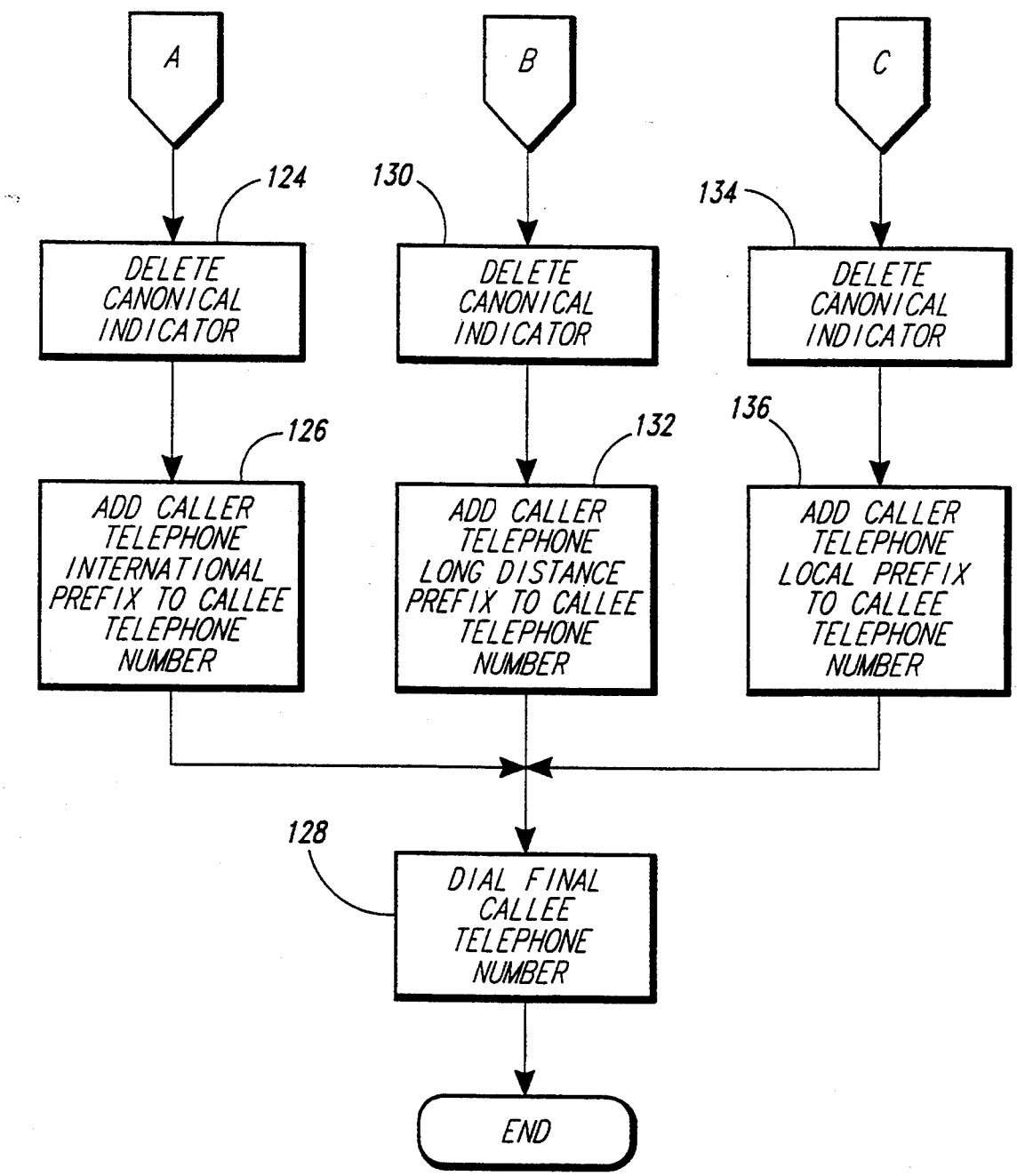
FIG. 2B is a continuation of the flow chart of FIG. 2A.

The method used to determine the final callee canonical telephone number is shown in the flow charts of FIGS. 2A–2B. In FIG. 2A, the system 10 starts at 100. The system 10 determines whether the user is entering a canonical callee telephone number or a non-canonical callee telephone number. The system 10 uses a canonical indicator to identify a canonical telephone number. In the presently preferred embodiment, a callee telephone number is a canonical telephone number when the first character is a "+" sign. Obviously, other selected characters or techniques could be used to identify a canonical telephone number. If the first character is not a "+" sign, the callee telephone number is not a canonical telephone number and the result of decision 102 is NO. In that event, the system 10 accepts the callee telephone number in step 104 and dials the callee telephone number in step 106 without any alteration of the callee telephone number.

If the first character is a "+" sign, it indicates that the callee telephone number is a canonical telephone number, and the result of decision 102 is YES. In that event, the system 10 accepts the callee canonical telephone number in step 110. Step 110 of inputting a callee canonical telephone number may be performed by selecting a callee canonical telephone number from the callee canonical telephone numbers stored in the phone book storage area 18, as previously described.

In step 112, the system 10 inputs the caller canonical telephone number from the station information storage area 36 (see FIG. 1). The system 10 compares the international codes of the caller canonical telephone number and the callee canonical telephone number in decision 114. If the two international codes match, the result of decision 114 is YES. In that case, the system 10 deletes the international code from the callee canonical telephone number in step 116. In decision 118, the system 10 compares the long distance codes (area codes) of the caller canonical telephone number and the callee canonical telephone number. If the two area codes match, the result of decision 118 is YES. In that case, the system 10 deletes the area code from the callee canonical telephone number in step 120. Note that in some locations it is necessary to dial the area code even though the caller and callee canonical telephone numbers have the same area code. For example, it is necessary to dial a "1" long distance prefix and the 206 area code to complete a telephone connection in some parts of the Seattle area. The system 10 (see FIG. 1) can be configured so as not to delete the area code if the caller and callee area codes match. Alternatively, the system 10 could be configured to compare the exchange portions of the caller and callee canonical telephone numbers to determine if the area code is required.

If the international codes of the caller canonical telephone number and the callee canonical telephone number do not match, the result of decision 114 is NO. This indicates that the callee telephone number is an international call and requires the complete callee canonical telephone number. The system 10 does not delete the international code from the callee canonical telephone number. Instead, the system 10 deletes the canonical indicator (i.e., the "+" sign) in step 124, shown in FIG. 2B. In step 126, the system 10 adds the required caller telephone prefix for international calls to the callee canonical telephone number to generate the final callee canonical telephone number. The system 10 then proceeds to dial the final canonical telephone number in step 128.

Similarly, if the callee and caller international codes did match, but the area codes did not match, the result of decision 118, shown in FIG. 2A, is NO and the system 10 does not delete the area code from the callee canonical telephone number. Note that the international code has been previously deleted from the callee canonical telephone number by step 116. The callee area code is not deleted, but the system 10 does delete the canonical indicator in step 130 of FIG. 2B. In step 132, the system 10 adds the required caller telephone prefix for long distance calls to the callee canonical telephone number to generate the final callee canonical telephone number. The system 10 then proceeds to dial the final canonical telephone number in step 128.

If the system 10 is used only within one country, the international code could be deleted from the canonical telephone number. In this case, the system 10 only compares the area codes.

If the callee and caller international codes and long distance codes both match, the result of decisions 114 and 118 in FIG. 2A are both YES. In that event, the system 10 need only dial the local telephone number.

Note that the international code and the area code have previously been deleted from the callee canonical telephone number in steps 116 and 120, respectively. Following step 120, in step 134, shown in FIG. 2B, the system 10 deletes the canonical indicator. In step 136, the system 10 adds the required caller telephone prefix, if any, for local calls to the callee canonical telephone number to generate the final callee canonical telephone number. As previously discussed, the caller telephone local prefix may be null in which case the system 10 adds nothing to the callee canonical telephone number in step 136. The system 10 then proceeds to dial the final canonical telephone number in step 128.

As an example of the process described above consider that a person in the Seattle area has a caller canonical telephone number of 1 206 555-1234, an international prefix of 9011, and that the caller wishes to call a callee in Paris, France having a callee canonical telephone number of 33 1 5555 1357. The result of decision 114 in FIG. 2A is NO, and the system 10 will not delete any of the callee canonical telephone number. Rather, the system 10 will delete the canonical indicator in step 124, shown in FIG. 2B, and add the caller telephone prefix (9011) for international telephone calls in step 126. Therefore, the final callee telephone number dialed by the dialer 30 (see FIG. 1) in step 128 is 9011 33 1 5555 1357.

As an additional example, consider that the caller in Seattle wishes to call a callee in Calif. having a callee canonical telephone number of 1 415 555-4321. The result of decision 114 in FIG. 2A is YES, and the system 10 deletes the international code in step 116. However, the result of decision 118 is NO, and the system 10 does not delete the area code. The system 10 deletes the canonical indicator in step 130 and adds the caller telephone long distance prefix in step 132. Thus, the final callee telephone number in this example is 91 415 555-4321, assuming the caller telephone long distance prefix is 91.

Thus, the final callee telephone number dialed by the system 10 in step 128 is only the portion of the callee canonical telephone number that is required for the proper connection from the caller location. The user may make telephone calls without having to be concerned about the local prefixes or the various codes required for the proper connection with the desired callee.

While the present invention does not shorten the prefixes and codes used from a particular location, it does simplify the process of placing telephone calls by automatically determining which portions of a callee canonical telephone number are required. The system 10 also automatically adds the appropriate prefix to generate the final callee telephone number.

It is to be understood that even though various embodiments and advantages of the present invention have been set forth in the foregoing description, the above disclosure is illustrative only, and changes may be made detail, yet remain within the broad principles of the invention. Therefore, the present invention is to be limited only by the appended claims.

I claim:

1. A personal dialing apparatus connectable to a telephone exchange for telephonic communication from a first location, the apparatus comprising:
a station information storage area storing a station canonical telephone number for the first location, said station canonical telephone number having first and second portions;

a phone book storage area for storing a plurality of canonical telephone numbers for locations other than the first location, each of said stored canonical telephone numbers having first and second portions;

a display device coupled to said phone book storage area to display at least a portion of said plurality of stored canonical telephone numbers to a user;

user selectable means for allowing the user to select one of said plurality of stored canonical telephone numbers displayed on said display device;

matching means for sequentially comparing said first and second portions of said station canonical telephone number with said first and second portions of said selected canonical telephone number, said matching means comparing said first portion of said station canonical telephone with said first portion of said selected canonical telephone number and generating a first match signal indicating that said first portion of said station canonical telephone number matches said first portion of said selected canonical telephone number, said matching means comparing said second portion of said station canonical telephone with said second portion of said selected canonical telephone number only if said first match signal was generated, said matching means generating a second match signal indicating that said second portion of said station canonical telephone number matches said second portion of said selected canonical telephone number;

alteration means for deleting said first portion of said selected canonical telephone number in response to said first match signal, and deleting said second portion of said selected canonical telephone number in response to said second match signal to generate a callee telephone number;

a dialer generating dialing signals to initiate telephonic communication to said callee telephone number; and a coupler selectively operable by the user to couple said dialer to the telephone exchange via a subscriber telephone line.

2. The apparatus of claim 1 wherein said station information storage area contains a plurality of telephone prefixes, the apparatus further including a prefix adder means for adding a selected one of said prefixes to said callee telephone number to generate a final callee telephone number, said dialer generating dialing signals on the telephone exchange to initiate telephonic communication with said final callee telephone number.

3. The apparatus of claim 1 wherein said first portion is an international code and said second portion is a long distance code for said station canonical telephone number.

4. The apparatus of claim 1, further including a keypad to permit the manual entry of said callee canonical telephone numbers by a user.

5. The apparatus of claim 1, further including a user input device to alter said station canonical telephone number.

6. The apparatus of claim 1 for operation in a plurality of locations throughout the world, the apparatus further including update means for modifying said phone book storage area such that the apparatus operates in any location in the world with said modified phone book storage area.

7. A personal dialing apparatus connectable to a telephone exchange for telephonic communication from a first location, the apparatus comprising:

a case containing the apparatus;

a station information storage area within said case to store a station canonical telephone number for the first location, said station canonical telephone number having first and second portions;

entry means within said case and manually operable by a user for entering a callee canonical telephone number, said callee canonical telephone number having first and second portions;

matching means within said case for sequentially comparing said first and second portions of said station canonical telephone number with said first and second portions of said callee canonical telephone number, said matching means comparing said first portion of said station canonical telephone with said first portion of said callee canonical telephone number and generating a first match signal indicating that said first portion of said station canonical telephone number matches said first portion of said callee canonical telephone number, said matching means comparing said second portion of said station canonical telephone with said second portion of said callee canonical telephone number only if said first match signal was generated, said matching means generating a second match signal indicating that said second portion of said station canonical telephone number matches said second portion of said callee canonical telephone number;

alteration means within said case for deleting said first portion of said callee canonical telephone number in response to said first match signal, and deleting said second portion of said callee canonical telephone number in response to said second match signal to generate a callee telephone number;

a dialer within said case to generate dialing signals corresponding to said callee telephone number; and a coupler selectively operable by the user to couple the apparatus to the telephone exchange via a subscriber telephone line.

8. The apparatus of claim 7 wherein said station information storage area contains a plurality of telephone prefixes, the system further including a prefix adder means for adding a selected one of said prefixes to said callee telephone number to generate a final callee telephone number.

9. The apparatus of claim 7 wherein said first portion is an international code and said second portion is a long distance code for said station canonical telephone number.

10. The apparatus of claim 7, further including phone book storage area for storing a plurality of callee canonical telephone numbers, said entry means including means for selecting one of said plurality of callee canonical telephone numbers as said callee telephone number.

11. The apparatus of claim 7 wherein said entry means comprises a keypad.

12. The apparatus of claim 7 wherein said matching means is a comparator.

13. A portable dialing apparatus for generating callee telephone numbers from telephones at a plurality of locations, the apparatus being connectable to a plurality of telephone exchanges, the apparatus comprising:

a station information storage area storing a station canonical telephone number for a first telephone at an initial location of the apparatus, said station canonical telephone number having first and second portions;

modification means operable by a user for modifying said station canonical telephone number wherein said station information storage area stores a canonical telephone number for a current location different from said initial location as said station canonical telephone number and is entered by the user only a single time at said current location;

entry means manually operable by the user for entering a callee canonical telephone number, said callee canonical telephone number having first and second portions;

matching means for comparing said first portion of said station canonical telephone number with said first portion of said callee canonical telephone number and generating a match signal indicating that said first portion of said station canonical telephone number matches said first portion of said callee canonical telephone number;

alteration means for deleting said first portion of said callee canonical telephone number in response to said first match signal to generate a callee telephone number; and a coupler selectively operable by the user to couple the apparatus to one of said plurality of telephone exchanges serving the location of the apparatus via a subscriber telephone line, whereby the apparatus automatically generates said callee telephone number after the user has entered said station canonical telephone number for said current location.

14. A method using a telephone dialing apparatus for generating a callee telephone number from a first telephone location, the method comprising the steps of:

storing a first telephone number for the first telephone location, said first telephone number comprising an international code, a long distance code, and a local telephone number;

storing a plurality of telephone numbers for locations other than the first location, each of said plurality of stored telephone numbers comprising an international code, a long distance code, and a local telephone number;

displaying at least a portion of said plurality of stored telephone numbers on a display viewable by a user;

sensing user input to select one telephone number from said displayed portion of said plurality of stored telephone numbers;

comparing said international code of said first telephone number with said international code of said selected telephone number to determine if said international codes match;

deleting said international code of said selected telephone number if said step of comparing said international codes determines that said international codes match;

if said step of comparing said international codes determines that said international codes match, comparing said long distance code of said first telephone number with said long distance code of said selected telephone number to determine if said long distance codes match;

deleting said long distance code of said selected telephone number if said step of comparing said long distance codes determines that said long distance codes match to generate a callee telephone number;

coupling the apparatus to a subscriber telephone line coupled to a telephone exchange; and dialing said selected telephone number by generating signals corresponding to said callee telephone number and coupling said signals to said telephone exchange via said subscriber telephone line.

15. The method of claim 14, further including the step of adding an international prefix to said selected telephone number if said step of comparing said international codes determines that said international codes do not match.

16. The method of claim 14, further including the step of adding a long distance prefix to said selected telephone number if said step of comparing said international codes determines that said international codes match and said step of comparing said long distance codes determines that said long distance codes do not match.

17. A method using a telephone dialing apparatus for calling a callee telephone number from a first telephone location, the method comprising the steps of:

defining a first telephone number for the first telephone location, said first telephone number comprising first, second, and third portions;

determining a second telephone number for a second telephone location, said second telephone number comprising first, second, and third portions;

sequentially comparing said first and second portions of said first telephone number with said first and second portions of said second telephone number to determine if said first and second portions match;

deleting said first portion of said second telephone number if said first portions match;

deleting said second portion of said second telephone number if said first portion of said second telephone number has been deleted and said second portions match to generate a callee telephone number;

coupling the apparatus to a subscriber telephone line coupled to a telephone exchange; and generating signals on said subscriber telephone line to call the second telephone, said signals corresponding to said callee telephone number.

18. The method of claim 17, further including the steps of:

adding a first prefix to said second telephone number if said step of comparing determines that said first portions do not match; and adding a second prefix to said second telephone number if said step of comparing determines that said first portions match and that said second portions do not match.

19. The method of claim 17 wherein the first telephone location contains a storage location having a plurality of stored telephone numbers for a plurality of telephone locations other than the first telephone location, the method further including the step of selecting one of said plurality of stored telephone numbers as said second telephone number.

20. A method of using a portable telephone dialing apparatus for calling a callee telephone number from a caller telephone, the method comprising the steps of:

defining a caller telephone number for the caller telephone at a first location, said caller telephone number comprising first and second portions;

sensing user entry of a second telephone number for a second location, said second telephone number comprising first and second portions;

comparing said first portion of said first telephone number with said first portion of said second telephone number to determine if said first portions match;

deleting said first portion of said second telephone number if said first portions match to generate a callee telephone number;

coupling the apparatus to a subscriber telephone line coupled to a telephone exchange serving said first location;

generating signals on said subscriber telephone line coupled to said telephone exchange serving said first location to call the second telephone, said signals corresponding to said callee telephone number;

moving the apparatus to a new location wherein said caller telephone number at said new location is different from said caller telephone number at said first location;

redefining said caller telephone number to be said caller telephone number at said new location;

using said steps of comparing and deleting to generate a new callee telephone number based on said new location, whereby the user redefines said caller telephone number at said new location and the apparatus automatically generates said new callee telephone number based on said redefined caller telephone number;

coupling the apparatus to a new subscriber telephone line coupled to a telephone exchange serving said new location; and generating new signals on said subscriber telephone line coupled to said telephone exchange serving said new location, said new signals corresponding to said new callee telephone number.

* * * * *